US008891906B2

(12) United States Patent
Ndiour et al.

(10) Patent No.: US 8,891,906 B2
(45) Date of Patent: Nov. 18, 2014

(54) PIXEL-ADAPTIVE INTERPOLATION ALGORITHM FOR IMAGE UPSCALING

(75) Inventors: Ibrahima Ndiour, Chandler, AZ (US); Jorge E. Caviedes, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 13/542,397

(22) Filed: Jul. 5, 2012

(65) Prior Publication Data

US 2014/0010478 A1    Jan. 9, 2014

(51) Int. Cl.
*G06K 9/32* (2006.01)
*G06T 3/40* (2006.01)
*H04N 7/01* (2006.01)

(52) U.S. Cl.
CPC ............ *G06T 3/4007* (2013.01); *H04N 7/0142* (2013.01)
USPC ...................................................... 382/300

(58) Field of Classification Search
None
See application file for complete search history.

(56) References Cited

U.S. PATENT DOCUMENTS

| | | | | |
|---|---|---|---|---|
| 4,642,678 A * | 2/1987 | Cok | ............................ | 348/242 |
| 5,832,143 A * | 11/1998 | Suga et al. | .................... | 382/300 |
| 6,219,464 B1 * | 4/2001 | Greggain et al. | ............. | 382/298 |
| 6,782,143 B1 * | 8/2004 | Dube et al. | ................... | 382/300 |
| 7,126,643 B2 * | 10/2006 | Song et al. | .................... | 348/448 |
| 7,542,053 B2 * | 6/2009 | Berenguer et al. | ........... | 345/660 |
| 7,554,559 B2 * | 6/2009 | Lu et al. | ........................ | 345/606 |
| 7,876,979 B2 * | 1/2011 | Lee et al. | ...................... | 382/300 |
| 8,094,967 B2 * | 1/2012 | Diggins | ........................ | 382/275 |
| 8,363,135 B2 * | 1/2013 | Dicks | ............................ | 348/280 |
| 2004/0135926 A1 * | 7/2004 | Song et al. | .................... | 348/448 |
| 2005/0058371 A1 * | 3/2005 | Huang et al. | ................. | 382/300 |
| 2005/0074186 A1 * | 4/2005 | Lu et al. | ........................ | 382/299 |
| 2006/0033936 A1 * | 2/2006 | Lee et al. | ....................... | 358/1.2 |
| 2008/0240559 A1 * | 10/2008 | Malvar | ......................... | 382/167 |
| 2009/0028464 A1 * | 1/2009 | Pan et al. | ...................... | 382/300 |
| 2009/0028465 A1 * | 1/2009 | Pan | ................................ | 382/300 |
| 2010/0182466 A1 * | 7/2010 | Chang et al. | ................. | 348/273 |
| 2010/0283799 A1 * | 11/2010 | Li et al. | ........................ | 345/660 |
| 2011/0103464 A1 * | 5/2011 | Zheng et al. | ............. | 375/240.02 |
| 2012/0027079 A1 * | 2/2012 | Ye et al. | .................... | 375/240.02 |
| 2012/0230608 A1 * | 9/2012 | Pan | ................................ | 382/300 |
| 2013/0028538 A1 * | 1/2013 | Simske et al. | ................ | 382/300 |
| 2013/0069975 A1 * | 3/2013 | Bernard | ....................... | 345/606 |
| 2013/0077862 A1 * | 3/2013 | Nomura et al. | ............... | 382/167 |
| 2013/0114906 A1 * | 5/2013 | Diggins | ........................ | 382/218 |

* cited by examiner

*Primary Examiner* — Barry Drennan
*Assistant Examiner* — Alexander J Lesnick
(74) *Attorney, Agent, or Firm* — Jordan IP Law, LLC (57) ABSTRACT

Methods and apparatuses use a pixel-adaptive interpolation algorithm to provide image upscaling. For each pixel location, the algorithm determines whether to use a high quality scaler algorithm (such as a polyphase filter, for example) or a directional interpolator to determine the pixel value. The determination of the appropriate interpolation algorithm is based on whether the pixel is determined to be an edge. If the pixel is determined to be an edge, the pixel-adaptive interpolation algorithm may use the directional interpolator to process the pixel; otherwise, the pixel is processed using a scaler algorithm.

20 Claims, 10 Drawing Sheets

```
right_max = max(Right Window);
right_min = min(Right Window);
right_var = right_max - right_min;
left_max = max(Left Window);
left_min = min(Left Window);
left_var = left_max - left_min;
allowed_var = min(right_var, left_var);
allowed_high_val = max(Center Pixels) + allowed_var;
allowed_low_val = min(Center Pixels) - allowed_var;
If (polyphase_output_pixel > allowed_high_val)
        output_pixel = allowed_high_val;
Else if (polyphase_output_pixel < allowed_low_val)
        output_pixel = allowed_low_yal;
Else
output_pixel = polyphase_output_pixel;
```

```
Th = tearing threshold to be defined
D1 = best interpolation direction
D2 = 2nd—best interpolation direction
Dref = D1(x,y)
Dsecond = D2(x,y)
Ddiagprev D1(X+2*Dref, y-2)
Ddiagafter = D1(x-2*Dref, y+2)
Jref = Iv(x,y)
Jdiagprev = J(x+2*Dref, y-2)
Jnorth = J(x, y-1)
Jsouth = J(x, y+1)
if ( (abs(Dref-Dsecond)>2) AND (abs(Dref - Ddiagprev)>2) OR (abs(Dref -Ddiagafter)>2) )
        J(x,y) = HQscaler(x,y)
else
        If ((((Jref <= Jnorth) AND (Jref >=Jsouth)) OR ((Jref >=Jnorth) AND (Jref<=Jsouth)) )
AND (abs(Jref-Jdiagprev) < Th ) )
                J(x,y) =Jref
        else
                J(x,y) = HQscaler(x,y)
        end
end
```

PIXEL-ADAPTIVE INTERPOLATION ALGORITHM FOR IMAGE UPSCALING

BACKGROUND

Given the demand for increasingly higher resolution and larger screen size display technology, legacy image content may be upscaled by increasingly larger scaling factors. Furthermore, image content to be upscaled may not only include natural imagery but may more often include computer graphics and synthetic imagery. This computer-generated image content can be degraded and artifacts can be introduced when this content is upscaled using image processing techniques typically used for upscaling natural imagery. Moreover, existing image processing techniques used to upscale image content by a large scaling factor and output high quality content can be computationally intensive and may not be suitable for real-time and hardware implementations.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Various implementations of this disclosure may provide less computationally intensive apparatuses and methods to upscale by a large scaling factor image content containing natural imagery and computer-generated imagery such as computer graphics and synthetic imagery to provide high quality image content. The apparatuses and methods of this disclosure may use a pixel-adaptive interpolation algorithm to provide real-time, high quality image upscaling. For each pixel location, the algorithm can determine whether to use a high quality scaler algorithm (such as a polyphase filter, for example) or a directional interpolator to determine the pixel value. The determination of the appropriate interpolation algorithm may be based on whether the pixel is determined to be an edge. If the pixel is determined to be an edge, the pixel-adaptive interpolation algorithm may use the directional interpolator to process the pixel; otherwise, the pixel can be processed using a high quality scaler algorithm.

Figure 1:
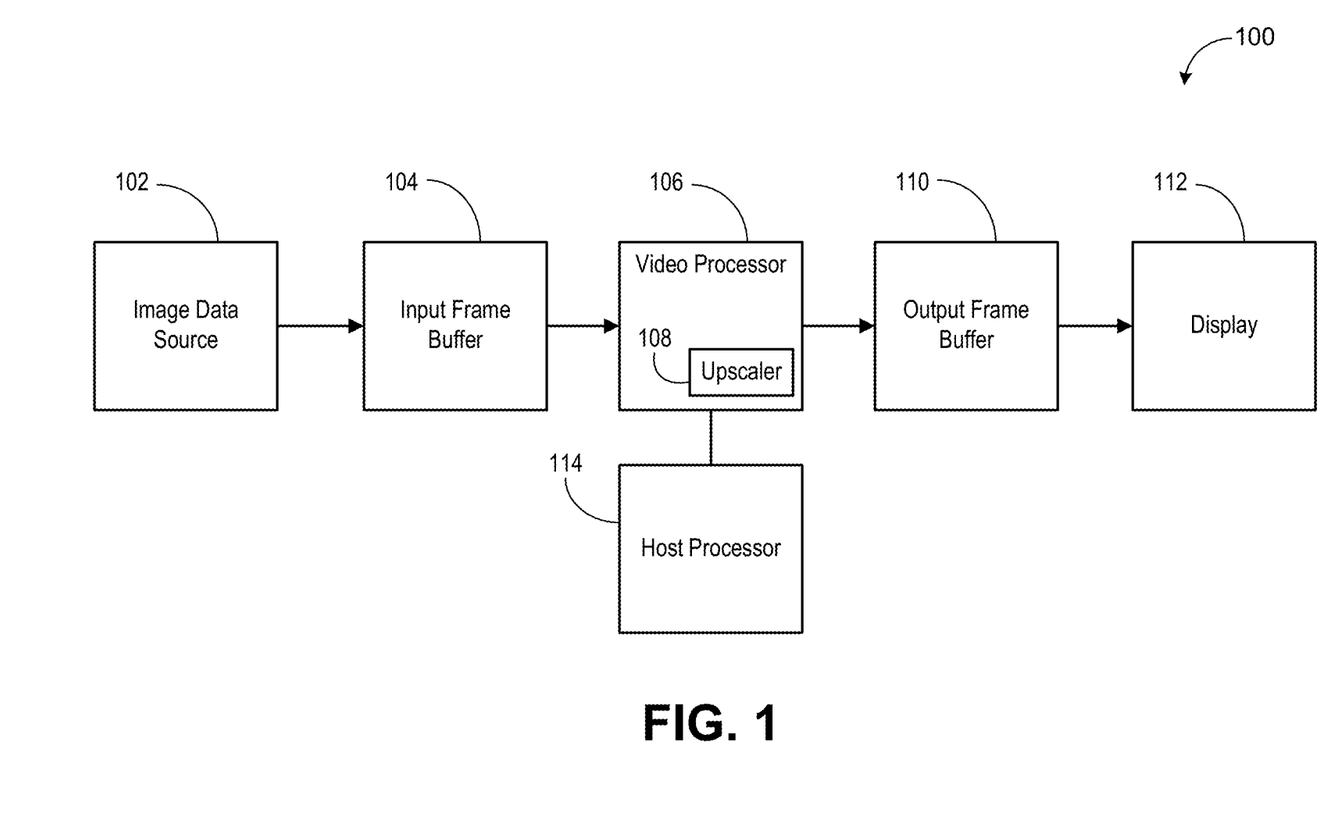
FIG. 1 is a block diagram illustrating an example system for processing and displaying image and video signals.

FIG. 1 illustrates an example system 100 that processes and displays image and video signals. The system 100 may include an image data source 102, an input frame buffer 104, a video processing device 106 having an upscaling circuit 108, a host processor 114, an output frame buffer 110, and a display device 112.

The image data source 102 may, for example, include one or more of a television tuner, a DVD drive, a computer hard drive, a network interface, a cable television set-top box, a digital video tape recorder, a personal video recorder, etc.

The input frame buffer 104 may be coupled to the image data source 102 to store one or more image data frames provided by the image data source 102.

The video processing device 106 may be coupled to the input frame buffer and may process the input image signal such as upscale the input image signal by the upscaling circuit 108.

The host processor 114 may be coupled to the video processing device 106. The host processor 114 may be a general purpose microprocessor, microcontroller or the like, and may control the video processing device 106 and/or other aspects of the system 100.

The output frame buffer 110 may be coupled to the video processing device 106 to store processed (e.g., upscaled) image data frames output from the video processing device 106.

The display device 112 (for example a CRT, flat panel display, liquid crystal display, etc.) may be coupled to the output frame buffer 110 to display image signals provided from the output frame buffer 110.

Figure 2A:
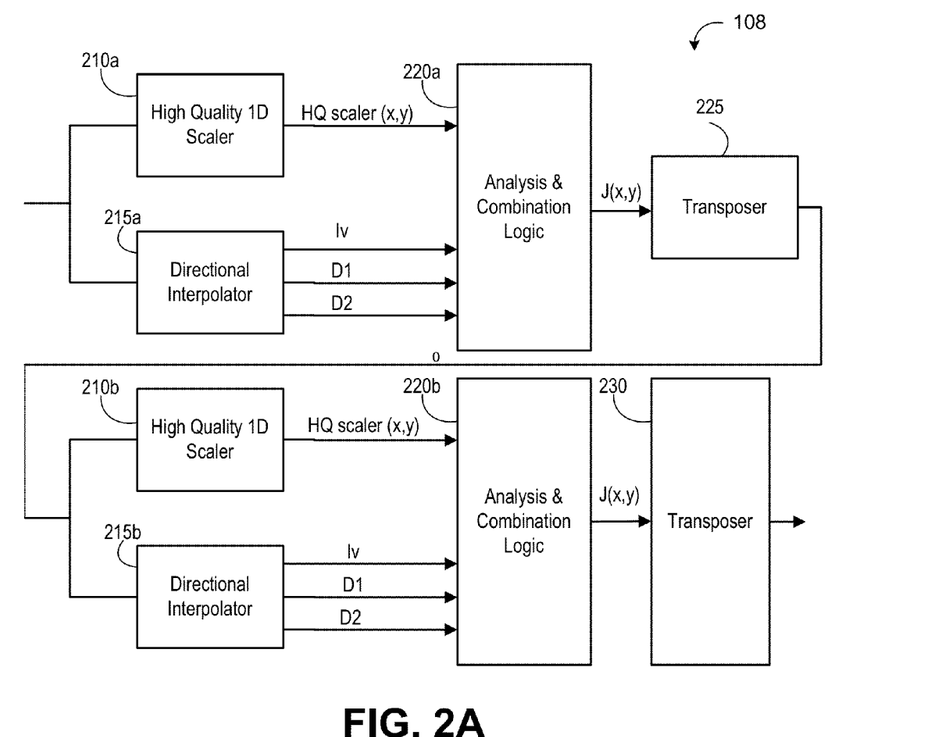
FIGS. 2A and 2B are block diagrams illustrating example upscaling circuits to upscale image data frames by a scaling factor N.

FIG. 2A illustrates an example upscaling circuit 108 of FIG. 1 to upscale image data frames by a scaling factor N. The upscaling circuit 108 may include high quality one-dimensional ("1D") scalers 210a, 210b (such as 1D polyphase scalers); directional interpolators 215a, 215b; analysis and combination logic 220a, 220b and transposers 225a, 225b.

Figure 2B:
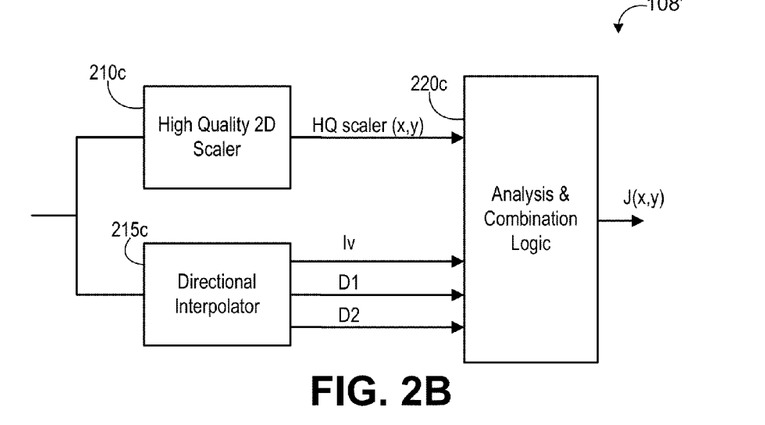

FIG. 2B illustrates another example upscaling circuit 108' of FIG. 1 to upscale image data frames by a scaling factor N. In FIG. 2B, ID scalers 210a, 210b are replaced by a high quality two-dimensional ("2D") scaler 210c.

The high quality ID scalers 210a, 210b or 2D scaler 210c can be any scaler that preserves or attempts to preserve details in an input image while minimizing visible artifacts in the upscaled output. In some implementations, high quality ID scalers 210a, 210b or 2D scaler 210c can include interpolators based on any of the following functions or methods: windowed sinc, bicubic, lanczos, spline, higher-order statistics, least squares, wavelets, pixel art, partial differential equations, and fractals.

In some implementations, the 1D scalers 210a, 210b or 2D scaler 210c can be based on any implementation of the polyphase filters disclosed in U.S. Pat. No. 7,542,053 to Berenguer et al. (the "'053 patent").

In some implementations, the 1D scalers 210a, 210b or 2D scaler 210c can include interpolators based on methods more complex than nearest neighbor and bilinear interpolation.

Figure 3:
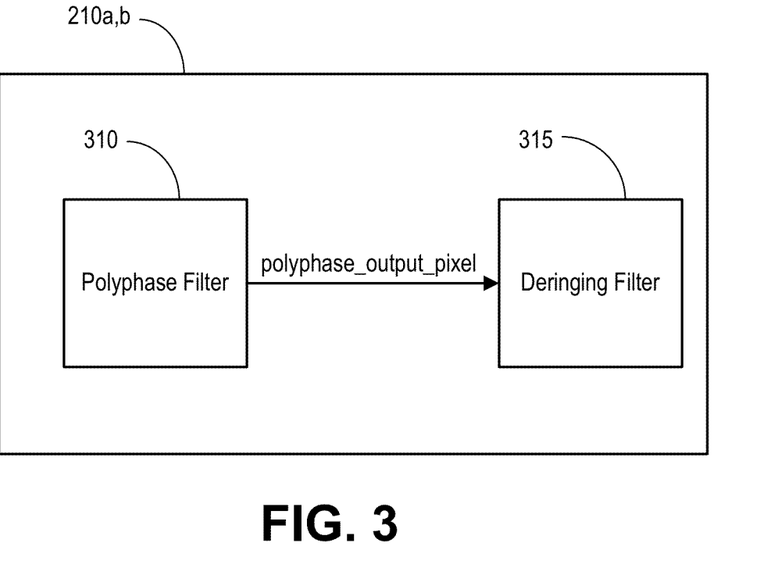
FIG. 3 is a block diagram illustrating an example system one dimensional scaler.

As shown in FIG. 3, in some implementations, the 1D scalers 210a, 210b or 2D scaler 210c can include a polyphase filter 310, such as any implementation of the polyphase filter disclosed in, for example, the '053 patent, and a deringing filter 315.

As discussed above, image content to be upscaled not only includes natural imagery but increasingly includes computer graphics and synthetic imagery. This computer-generated image content can be degraded, and artifacts (such as ringing artifacts) can be introduced when this content is upscaled using image processing techniques typically used for upscaling natural imagery. A ringing artifact is a visual artifact where an output image appears to have repeated edges around high contrast edges. This ringing artifact can be caused by the loss of high frequencies on edge structures when the edge structures are processed using image processing techniques typically used for upscaling natural imagery. The deringing filter 315 is configured to minimize this ringing artifact.

Figure 4A:
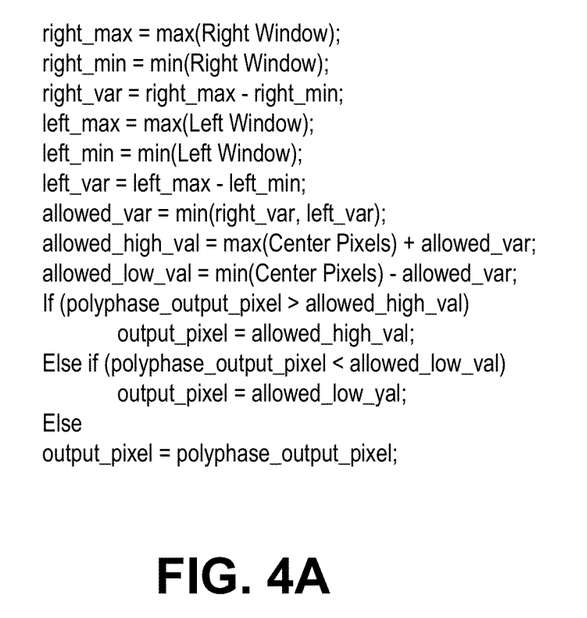
FIG. 4A illustrates an example pseudo code for the deringing filter.
Figure 4B:
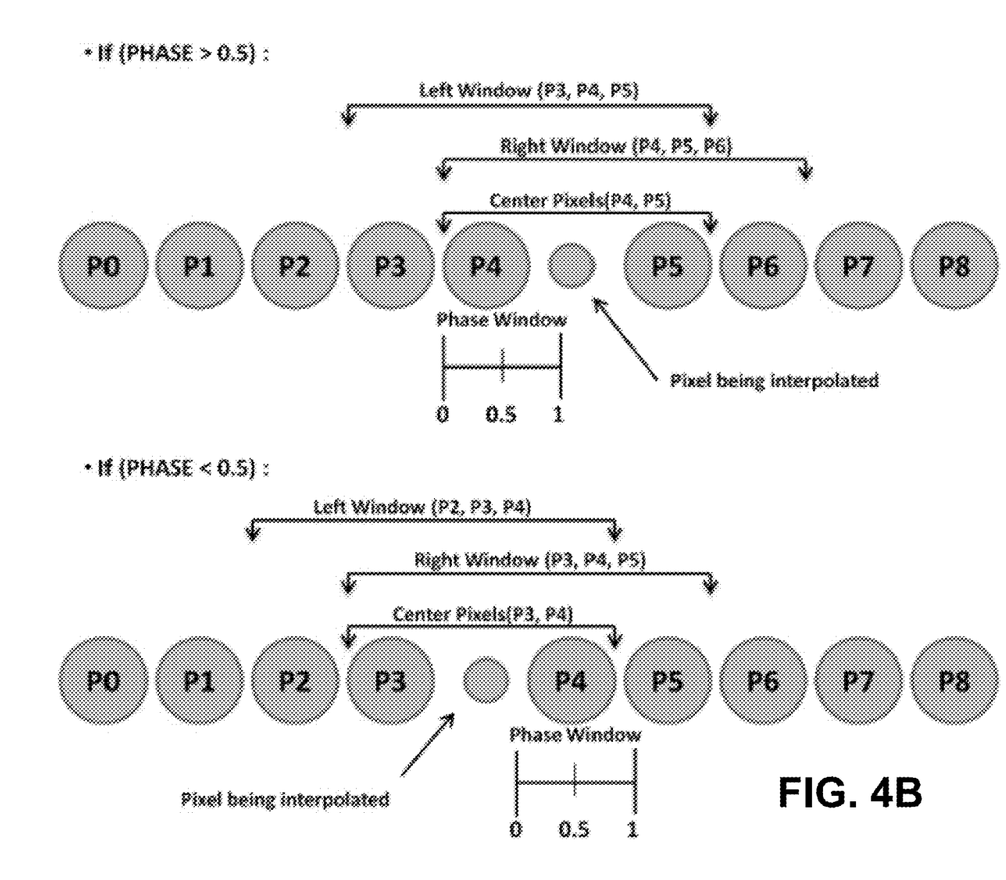
FIG. 4B illustrates variables of the example code of FIG. 4A.

FIG. 4A illustrates an example pseudo code for the deringing filter where the variables "Right Window", "Left Window", and "Center Pixels" are a first, second, and third set of surrounding pixels, respectively, of the pixel being interpolated. FIG. 4B illustrates example "Right Window", "Left Window", and "Center Pixels."

Returning to FIG. 2A, the directional interpolators 215a, 215b can be configured to detect straight edges and their orientations and use linear interpolation along the edges to preserve the edges.

In some implementations, the directional interpolators 215a, 215b test a number of predefined directions to detect straight edges. In some implementations, the directional interpolators 215a, 215b, can be any implementation of the directional interpolators disclosed in U.S. Pat. Nos. 7,554,559.

In some implementations, the directional interpolators 215a, 215b identify the direction along which interpolation needs to be performed and then linear interpolation is used to create the new pixels.

Figure 5A:
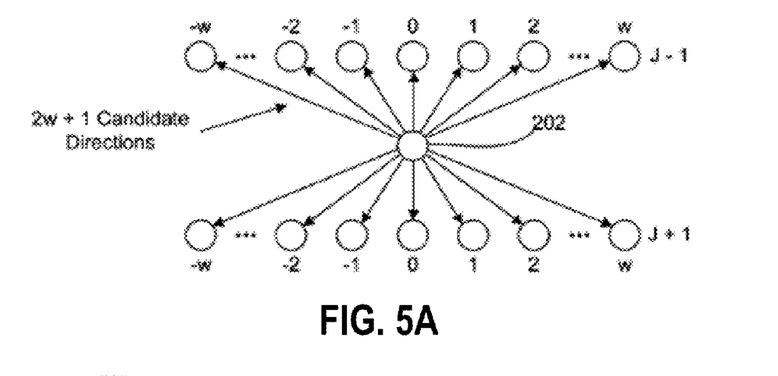
FIG. 5A illustrates 2W+1 potential directions for an edge going through a pixel being interpolated.
Figure 5B:
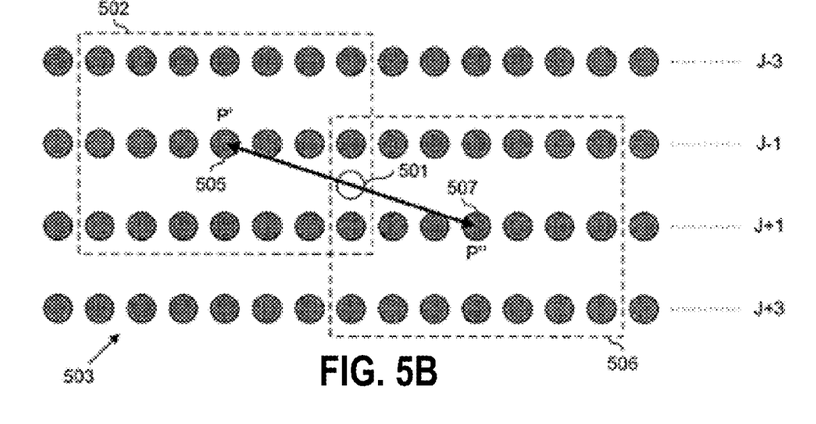
FIGS. 5B, 5C, and 5D illustrate example pixels used to compute a SAD-based metric for a possible edge direction for a pixel being interpolated.
Figure 5C:
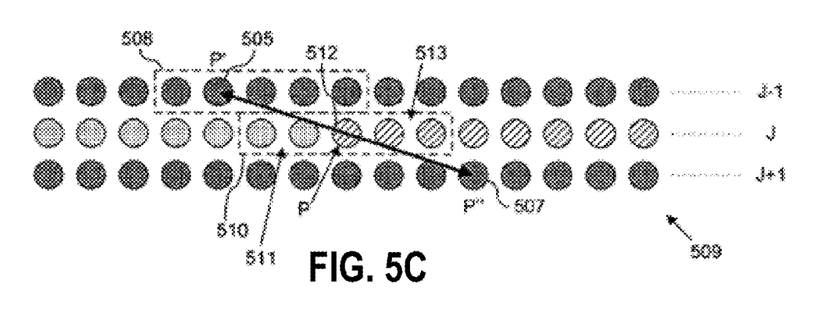
Figure 5D:
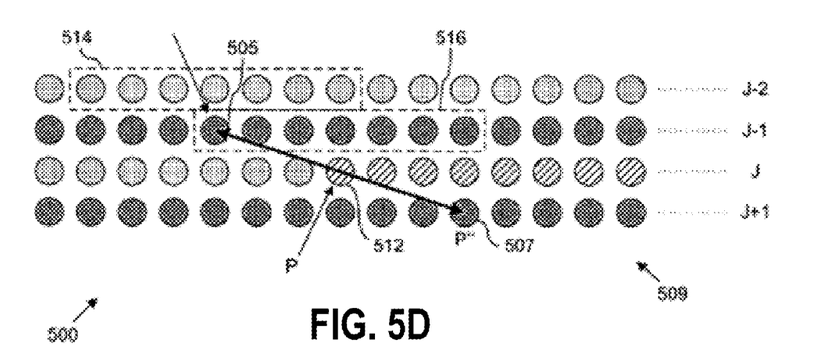

Referring to FIG. 5A, in some implementations, a sum of absolute difference SAD-based metric (e.g., the SAD disclosed in U.S. Pat. Nos. 7,554,559) is used to score and rank 2W+1 potential directions for an edge going through a pixel being interpolated. The SAD-based metric may be a spatial correlation measure computed over sensible 2D windows in the neighborhood of the pixel being interpolated. Referring to FIGS. 5B, 5C, and 5D, in some implementations, the computation of the SAD-based metric for each possible edge direction for the pixel 501 being interpolated uses the two end pixels, P' and P''', for a given direction d and three pairs of windows (502, 506), (508, 510), (514, 516). The SAD-based metric (e.g., weighted average of the three SADs over the three pairs of windows) can be computed for all potential 2W+1 directions and the corresponding scores are stored in an array to be sorted in ascending order (e.g., from most confident interpolation direction to least confident). The direction with the lowest score may determine the orientation of the edge. Once the edge orientation is determined, the two end pixels may then be used as input pixels to linearly interpolate.

The directional interpolators 215a, 215b output the directionally-interpolated pixel value ("Iv"), a first interpolation direction ("D1"), and a second interpolation direction ("D2") where the first interpolation direction may be the most likely edge direction and the second interpolation direction may be the next most likely edge direction.

Figure 5E:
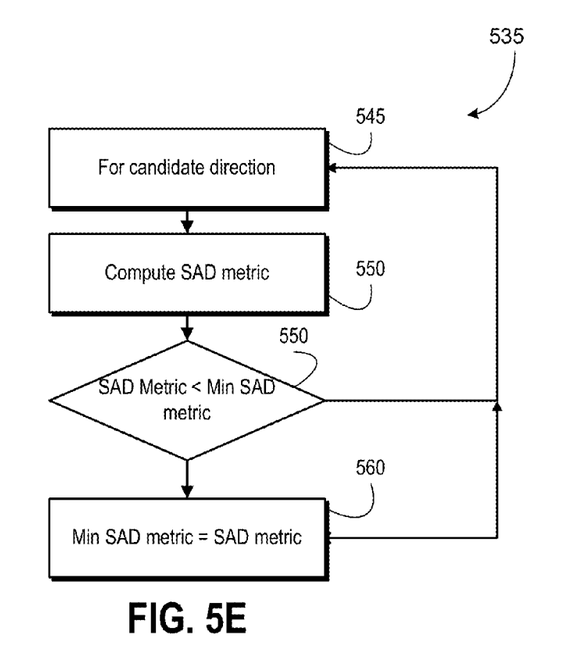
FIG. 5E illustrates an example method of computing a first interpolation direction D1.

FIG. 5E illustrates an example method 535 of computing a first interpolation direction D1. For each direction (stage 455), at stage 550 a SAD-based metric (e.g., weighted average of the three SADs over the three pairs of windows) can be computed. At stage 555, it may be determined whether the SAD-based metric is less than a minimum SAD-based metric. If the SAD-based metric is not less than a stored minimum SAD-based metric, then the illustrated method returns to stage 545 to repeat stages 550 through 560 for the next direction. If the SAD-based metric is less than a stored minimum SAD-based metric, then at stage 560, the SAD-based metric computed at stage 550 may be stored as the minimum SAD-based metric and the illustrated method returns to stage 545 to repeat stages 550 through 560 for the next direction.

Figure 6:
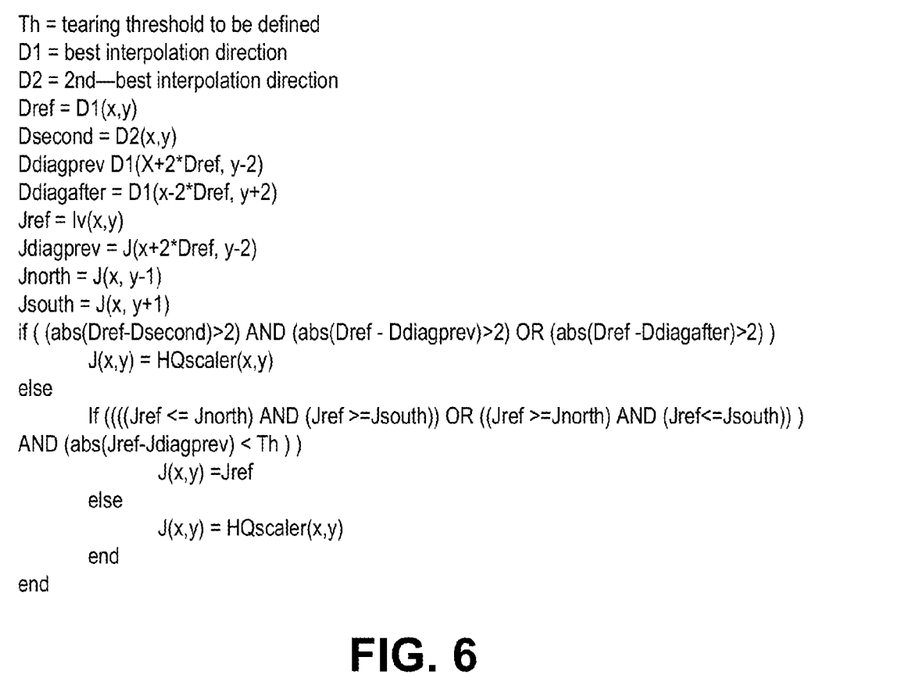
FIG. 6 illustrates an example pseudo code for an analysis and combination logic.

The illustrated analysis and combination logic 220a, 220b receives the interpolated pixels from the 1D scalers 210a, 210b or 2D scaler 210c and the directional interpolators 215a, 215b, respectively and determines which interpolated pixels to use. In some implementations, for each interpolated pixel being considered (i.e., HQ scaler (x,y) and Iv(x,y)) at location (x, y), this determination may be based on one or more of the following: the consistency of the first interpolation direction ("D1") and the second interpolation direction ("D2"); spatial consistency of the first interpolation direction ("D1") across the image; and consistency of the interpolated pixel as measured by vertical and diagonal tearing. FIG. 6 illustrates an example pseudo code for the analysis and combination logic 220a, 220b.

Regarding the consistency of D1 and D2, in some implementations, if |D1−D2| is greater than a threshold value, then the analysis and combination logic 220 may determine that the interpolation directions D1, D2 output from the directional interpolator 215 are unreliable and may select the interpolated pixel from the scaler 210 for further use.

Regarding spatial consistency of D1, in some implementations, if D1 for the pixel at location (x, y) is not consistent with the interpolation direction determined for pixels at neighboring pixel locations, then the analysis and combination logic 220 may determine that the interpolation directions D1 output from the directional interpolator 215 is unreliable and may select the interpolated pixel from scaler 210 for further use. In some implementations, the neighboring pixels tested for spatial consistency in the determined interpolation direction D1 for the pixel at (x,y) include the pixel two lines above the pixel at (x, y) along the direction D1 (i.e., (x+2D1 (x,y), y−2)) and the pixel two lines below the pixel at (x, y) along the direction D1 (i.e., (x−2D1(x,y), y+2)).

Finally, in some implementations, the analysis and combination logic 220 may select the interpolated pixel from either scaler 210 or the directional interpolator 215 that reduces vertical and diagonal tearing. As shown in FIG. 6, in some implementations, vertical tearing is measured by looking at the values of the two pixels immediately below and above the interpolated pixel being considered. In some implementations, diagonal tearing is measured by looking at the value of the interpolated pixel two lines above the interpolated pixel being considered along the direction D1.

Figure 7:
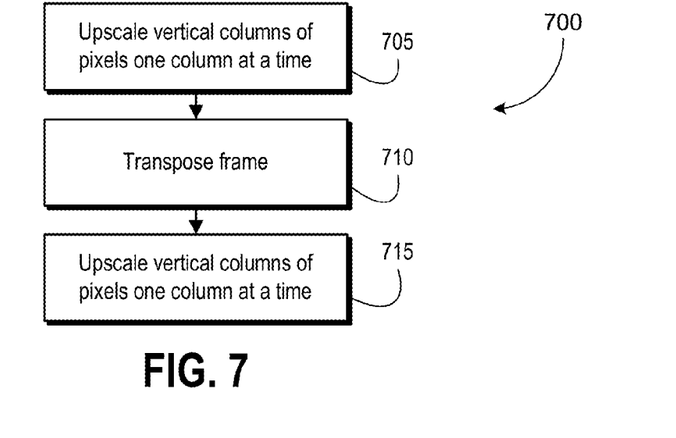
FIG. 7 illustrates an example method of upscaling image data frames.

FIG. 7 illustrates an example method 700 of upscaling image data frames. At stage 705, the vertical columns of pixels are upscaled one column at a time by the upscaling 108 to produce an intermediate upscaled frame. At stage 710, the new upscaled frame is transposed and at stage 715, the vertical columns of pixels of the transposed frame are upscaled one column at a time by upscaling circuit 108 to produce an output upscaled frame.

Figure 8:
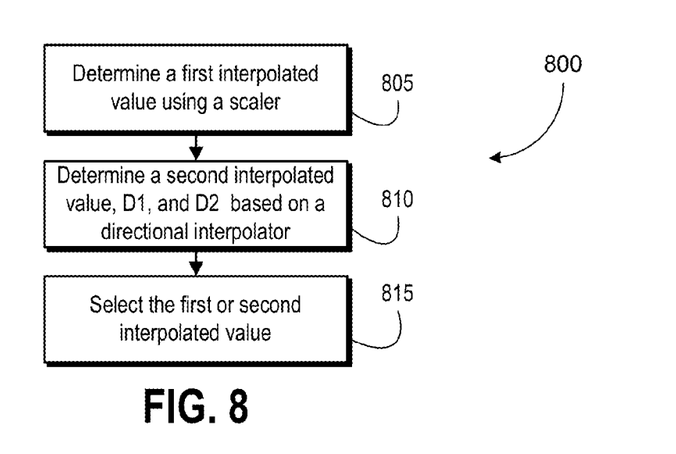
FIG. 8 illustrates an example method of processing a pixel location to determine an upscaled pixel value.

FIG. 8 illustrates an example method 800 of processing a pixel location to determine an upscaled pixel value. At stage 805, a scaler (e.g., the high quality 1D scaler 210a,b or the high quality 2D scaler 210c) is applied to a sequence of pixels for a pixel location (x,y) to produce a first interpolated value. At stage 810, a directional interpolator (e.g., the direction interpolater 215a,b) is applied to a sequence of pixels for the pixel location (x, y) to produce a second interpolated value, a first interpolation direction D1, and a second interpolation direction D2 where D1 is the most likely edge direction and the D2 is the next most likely edge direction. At stage 815, it is determined (e.g., by the analysis and combination logic 220a, 220b, 220c) whether to select the first interpolated value or the second interpolated value for the pixel location.

Figure 9:
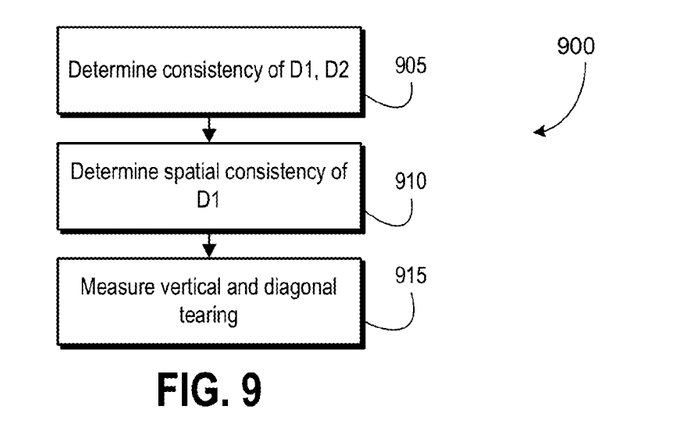
FIG. 9 illustrates an example method of determining whether to select a first interpolated value based on a high quality scaling algorithm or a second interpolated value based on a directional interpolations algorithm for the pixel location.

FIG. 9 illustrates an example method of determining whether to select a first interpolated value based on a high quality scaling algorithm or a second interpolated value based on a directional interpolation algorithm for the pixel location. At stage 905, the consistency of D1 and D2 is determined. At stage 910, a spatial consistency of D1 is determined. At stage 915, vertical and diagonal tearing is measured.

Computing devices contemplated to be within the scope of this disclosure include personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Figure 10:
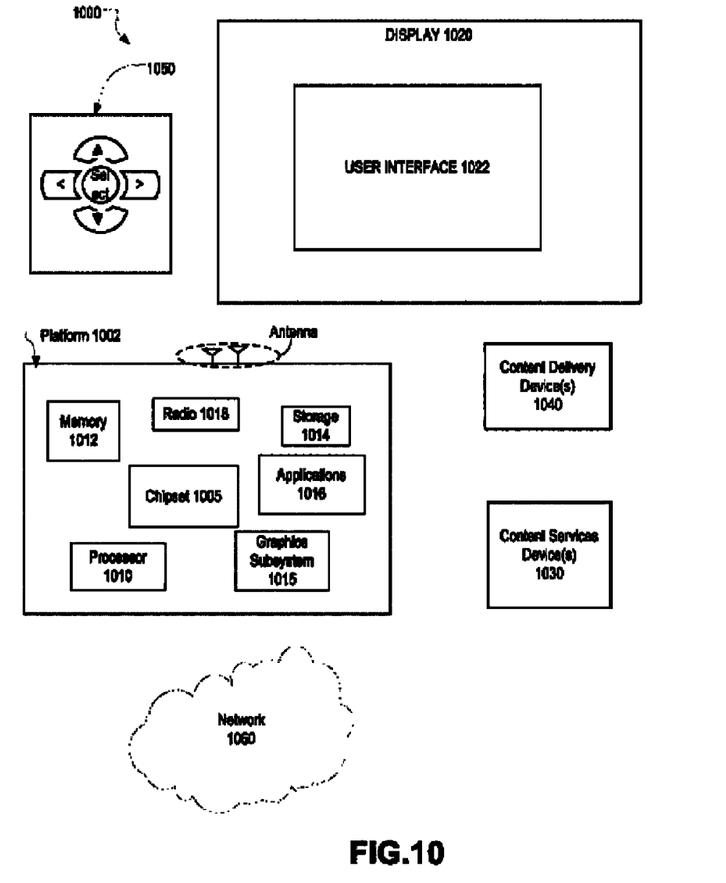
FIG. 10 illustrates an example embodiment of a system of this disclosure.

FIG. 10 illustrates an example embodiment of a system 300 of this disclosure comprising a platform 1002, a display 1020, content services device(s) 1030, content delivery device(s) 1040, and navigation controller 1050. In embodiments, system 1000 may be a media system although system 1000 is not limited to this context. For example, components of system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1000 comprises a platform 1002 coupled to a display 1020. Platform 1002 may receive content from a content device such as content services device(s) 1030 or content delivery device(s) 1040 or other similar content sources. A navigation controller 1050 comprising one or more navigation features may be used to interact with, for example, platform 1002 and/or display 1020. Each of these components is described in more detail below.

In embodiments, platform 1002 may comprise any combination of a chipset 1005, processor 1010, memory 1012, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 1010 may comprise dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1014 may comprise technology to increase the storage performance enhanced protection for valuable digital media when multiple hard drives are included, for example.

Graphics subsystem 1015 may perform processing of images such as still images or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. In embodiments, graphics subsystem 1015 could be integrated into processor 1010 or chipset 1005. In embodiments, graphics subsystem 1015 could be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 1018 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In embodiments, display 1020 may comprise any television type monitor or display. Display 1020 may comprise, for example, a computer display screen, touch screen display, video monitor, television-like device, and/or a television. Display 1020 may be digital and/or analog. In embodiments, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In embodiments, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In embodiments, content services device(s) 1030 may comprise a cable television box, personal computer, network, telephone, Internet enabled devices or appliance capable of delivering digital information and/or content, and any other similar device capable of unidirectionally or bidirectionally communicating content between content providers and platform 1002 and/display 1020 directly or via network 1060. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 receives content such as cable television programming including media information, digital information, and/or other content. Examples of content providers may include any cable or satellite television or radio or Internet content providers. The provided examples are not meant to limit embodiments of the invention.

In embodiments, platform 1002 may receive control signals from navigation controller 1050 having one or more navigation features. The navigation features of controller 1050 may be used to interact with user interface 1022, for example. In embodiments, navigation controller 1050 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be echoed on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In embodiments, controller 1050 may not be a separate component but integrated into platform 1002 and/or display 1020. Embodiments, however, are not limited to the elements or in the context shown or described herein.

In embodiments, drivers (not shown) may comprise technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 when the platform is turned "off." In addition, chip set 1005 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the invention.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
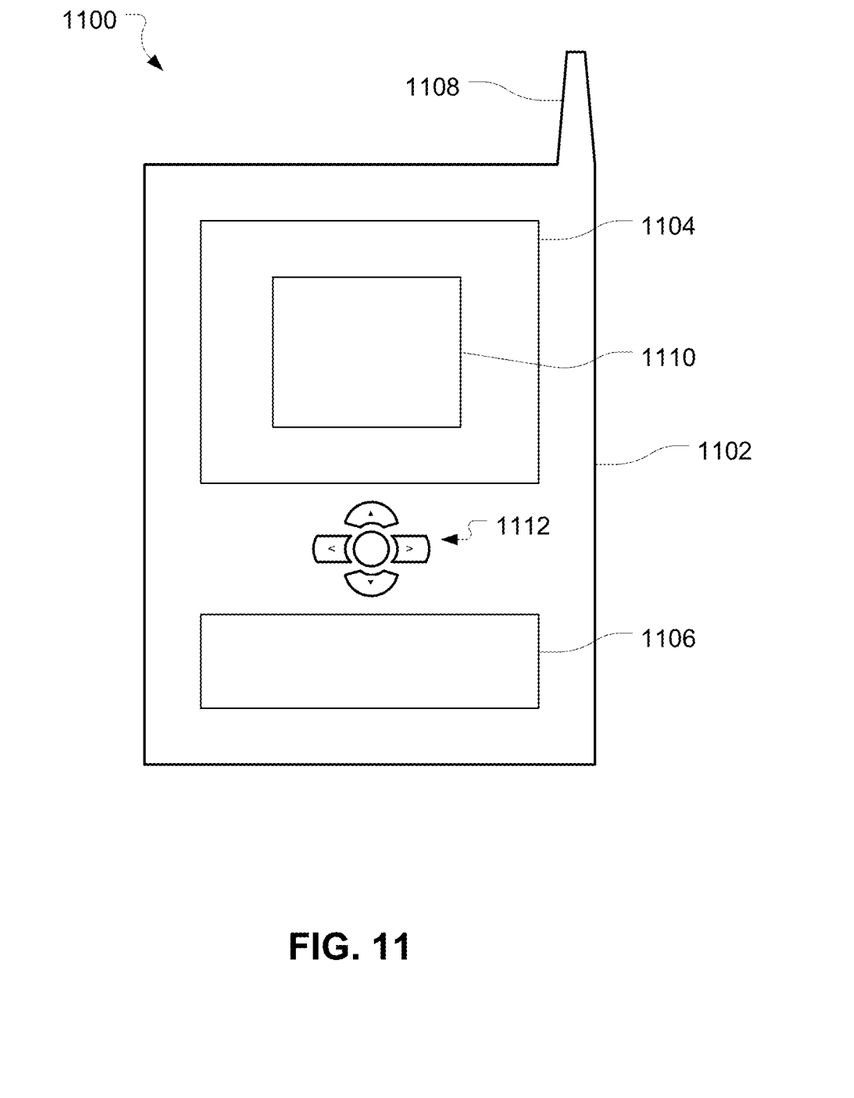
FIG. 11 is a block diagram of an example of a system having a small form factor according to an embodiment.

As described above, system 1000 may be embodied in varying physical styles or form factors. FIG. 11 illustrates embodiments of a small form factor device 1100 in which system 1000 may be embodied. In embodiments, for example, device 1100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may comprise a housing 1102, a display 1104, an input/output (I/O) device 1106, and an antenna 1108. Device 1100 also may comprise navigation features 1112. Display 1104 may comprise any suitable display unit for displaying information 1110 appropriate for a mobile computing device. I/O device 1106 may comprise any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments therefore may include a method comprising upscaling an image frame wherein upscaling an image frame comprises determining a first interpolated value for a pixel location using a scaler; determining a second interpolated value for the pixel location, a first interpolation direction for the pixel location, and a second interpolation direction for the pixel location using a directional interpolator; and determining whether to select the first interpolated value or the second interpolated value. Determining whether to select the first interpolated value or the second interpolated value comprises determining the consistency of the first interpolation direction and the second interpolation direction, determining a spatial consistency of the first interpolation direction, and measuring vertical tearing and diagonal tearing.

Embodiments may include a system comprising an image data source to provide at least one image data frame; an input frame buffer to store the image data frame; an upscaling circuit to upscale the image data frame to produce an upscaled image data frame; and an output frame buffer to store the upscaled image data frame. The upscaling circuit comprises a scaler to determine a first interpolated value for a pixel location; a directional interpolator to determine a second interpolated value for the pixel location, a first interpolation direction for the pixel location, and a second interpolation direction for the pixel location; and a logic circuit to select either first interpolated value or the second interpolated value.

Embodiments may include an apparatus comprising a scaler to determine a first interpolated value for a pixel location; a directional interpolator to determine a second interpolated value for the pixel location, a first interpolation direction for the pixel location, and a second interpolation direction for the pixel location; and a logic circuit to select either the first interpolated value or the second interpolated value.

Embodiments may include a computer readable medium comprising a set of instructions which, if executed by a processor, cause a computer to determine a first interpolated value for a pixel location using a scaler algorithm; determine a second interpolated value for the pixel location, a first interpolation direction for the pixel location, and a second interpolation direction for the pixel location using a directional interpolator; and determine whether to select the first interpolated value or the second interpolated value.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   upscaling an image frame wherein upscaling an image frame comprises:
   determining a first interpolated value for a pixel location using scaling, wherein the scaling includes deringing that utilizes a first set, a second set, and a third set of surrounding pixels of the pixel location;
   determining a second interpolated value for the pixel location using a directional interpolator, wherein determining the second interpolated value includes determining:
   a first interpolation direction for the pixel location, and
   a second interpolation direction for the pixel location; and
   determining whether to select the first interpolated value or the second interpolated value,
   wherein determining whether to select the first interpolated value or the second interpolated value comprises determining a consistency of the first interpolation direction and the second interpolation direction, determining a spatial consistency of the first interpolation direction, and measuring vertical tearing and diagonal tearing.

2. The method of claim 1, wherein the scaling comprises one or more of a one-dimensional scaling, a two-dimensional scaling, or a high quality scaling.

3. The method of claim 1, wherein the first interpolated value for a pixel location is determined using polyphase filtering.

4. The method of claim 1, wherein determining the consistency of the first interpolation direction and the second interpolation direction comprises determining an absolute value of a difference between the first interpolation direction and the second interpolation direction.

5. The method of claim 1, wherein determining the spatial consistency of the first interpolation direction comprises comparing the first interpolation direction with at least one interpolation direction for another pixel location.

6. A system comprising:
   an input frame buffer to store at least one image data frame;
   an upscaling circuit to upscale the image data frame to produce an upscaled image data frame; and
   an output frame buffer to store the upscaled image data frame;
   wherein the upscaling circuit comprises:
   a scaler to determine a first interpolated value for a pixel location, the scaler including a deringing filter that utilizes a first set, a second set, and a third set of surrounding pixels of the pixel location;
   a directional interpolator to determine a second interpolated value for the pixel location, a first interpolation direction for the pixel location, and a second interpolation direction for the pixel location; and
   a logic circuit to select either the first interpolated value or the second interpolated value, wherein the logic circuit is configured to
   determine a consistency of the first interpolation direction and the second interpolation direction, and
   measure vertical tearing and diagonal tearing.

7. The system of claim 6, wherein the scaler is one or more of a one-dimensional scaler, a two-dimensional scaler, or a high quality scaler.

8. The system of claim 6, wherein the scaler is a polyphase filter.

9. The system of claim 6, wherein the logic circuit is configured to determine a spatial consistency of the first interpolation direction.

10. An apparatus comprising:
    a scaler to determine a first interpolated value for a pixel location, the scaler including a deringing filter that utilizes a first set, a second set, and a third set of surrounding pixels of the pixel location;

a directional interpolator to determine a second interpolated value for the pixel location, a first interpolation direction for the pixel location, and a second interpolation direction for the pixel location; and a logic circuit to select either the first interpolated value or the second interpolated value, wherein the logic circuit is configured to determine a consistency of the first interpolation direction and the second interpolation direction, and measure vertical tearing and diagonal tearing.

11. The apparatus of claim 10, wherein the scaler is one or more of a one-dimensional scaler, a two-dimensional scaler, and a high quality scaler.

12. The apparatus of claim 10, wherein the scaler is a polyphase filter.

13. The apparatus of claim 10, wherein the logic circuit is configured to determine a spatial consistency of the first interpolation direction.

14. A non-transitory computer readable medium comprising a set of instructions which, if executed by a processor, cause a computer to:

determine a first interpolated value for a pixel location using a scaler algorithm, the scaler algorithm including a deringing component that utilizes a first set, a second set, and a third set of surrounding pixels of the pixel location;

determine a second interpolated value for the pixel location, a first interpolation direction for the pixel location, and a second interpolation direction for the pixel location using a directional interpolator; and determine whether to select the first interpolated value or the second interpolated value, wherein determining includes determining a consistency of the first interpolation direction and the second interpolation direction, and measuring vertical tearing and diagonal tearing.

15. The non-transitory computer readable medium of claim 14, further comprising a set of instructions which, if executed by a processor, cause a computer to determine a spatial consistency of the first interpolation direction.

16. The non-transitory computer readable medium of claim 15, wherein to determine a spatial consistency of the first interpolation direction comprises comparing the first interpolation direction with at least one interpolation direction for another pixel location.

17. The non-transitory computer readable medium of claim 14, further comprising a set of instructions which, if executed by a processor, cause a computer to perform a one-dimensional upscaling of an image frame to produce an intermediate upscaled frame; transpose the intermediate upscaled frame; and perform a one-dimensional upscaling of the transposed image frame.

18. The non-transitory computer readable medium of claim 14, wherein the scaler algorithm comprising implementing one or more of a one-dimensional filter, a two-dimensional filter, and a high quality filter.

19. The non-transitory computer readable medium of claim 14, wherein the scaler algorithm comprising implementing a polyphase filter.

20. The non-transitory computer readable medium of claim 14, wherein to determine a consistency of the first interpolation direction and the second interpolation direction comprises determining an absolute value of a difference between the first interpolation direction and the second interpolation direction.

* * * * *